United States Patent

[11] 3,548,133

| [72] | Inventor | Arthur D. Clauson |
| | | La Grange, Ill. |
| [21] | Appl. No. | 787,934 |
| [22] | Filed | Dec. 30, 1968 |
| [45] | Patented | Dec. 15, 1970 |
| [73] | Assignee | Sun Electric Corporation |
| | | a corporation of Delaware |

[54] FLOW TRANSDUCER
11 Claims, 3 Drawing Figs.

[52] U.S. Cl. .................................................. 200/81.9
[51] Int. Cl. .................................................. H01h 35/40
[50] Field of Search .................................... 200/81.4,
81.9, 82, 83.8, 82.3; 137/87; 188/151, 152; 303/6, 84A; 340/242

[56] References Cited
UNITED STATES PATENTS

| 2,273,394 | 2/1942 | Couty ........................... | 200/82(.3) |
| 2,633,148 | 3/1953 | Kelly ........................... | 200/82(.3)X |
| 3,358,097 | 12/1967 | Kersting ........................ | 200/82(.3) |
| 3,448,230 | 6/1969 | Bueler .......................... | 200/82(.3) |
| 2,450,961 | 10/1948 | Heymann et al. ................. | 200/81.4 |
| 2,826,754 | 3/1958 | Carignan ....................... | 200/81.9X |
| 3,233,059 | 2/1966 | Pridham, Jr. et al. ............ | 200/83.(.8) |
| 3,332,642 | 7/1967 | Halling ......................... | 200/83X |

FOREIGN PATENTS

| 187,359 | 1/1964 | Sweden ......................... | 200/82 |
| 351,848 | 3/1961 | Switzerland .................... | 200/82 |

*Primary Examiner*—R. K. Schaefer
*Assistant Examiner*—J. R. Scott
*Attorney*—Molenare, Allegretti, Neivitt & Witcoff

ABSTRACT: A fluid flow transducer responsive to the pulsating flow of fuel in a fuel injection system comprises a housing having a conductive plate mounted therein and a reciprocating pin moveably carried on the plate. Between fuel flow pulses, the pin contacts the housing to complete an electrical circuit between the housing and plate and when a fuel pulse occurs, the pin is reciprocally urged out of contact with the housing to open the circuit.

PATENTED DEC 15 1970

3,548,133

INVENTOR.
ARTHUR D. CLAUSON
BY Bair, Freeman
& Molinare
ATTORNEY

3,548,133

FLOW TRANSDUCER

BACKGROUND OF THE INVENTION

This invention relates to a fluid flow switch or transducer and, more particularly, to a fluid flow transducer which is responsive to the pulses of a pulsating fluid, such as fuel, to generate signals corresponding to the pulses.

In the timing and adjusting of combustion engines, and in particular engines of the fuel injected type, it is highly desirable to accurately detect the pulsating flow of fuel in the fuel injection line, in order to accurately determine the time duration of each pulse as well as the time of initiation of each pulse relative to the crankshaft rotation of the engine. Various devices have been employed in the past to measure such flow characteristics. However, such prior devices have generally been crude and time consuming to use and are generally incapable of accurate results and in some instances are unuseable, particularly were measurements are to be made at relatively high engine speeds and increased fuel pulse rates.

The fluid flow transducer incorporating the principles of my invention is capable of accurately detecting and signalling fluid pulses in pulsating fluid systems regardless of whether the fluid pulse repetition rates and/or the flow volume of the fluid are high or low. Such fluid flow transducer produces signals which may be utilized to trigger a variety of readout devices, such as timing lights, tachometers and oscilloscopes and will readily and accurately provide a signal which is indicative of the beginning and end of a fluid pulse as well as the duration of the pulse and the volume of the fluid in each pulse. The transducer of my invention is simple in construction and reliable in operation and is also inexpensive to construct. The transducer incorporating the principles of my invention is of the positive knife edge contact type and may be readily employed to measure the pulses obtaining in a fuel injection line of a combustion engine whether the engine is operating at a high or low speed. Finally interior elements of my transducer may be readily reversed without necessitating the provision of additional transducer and housing components.

SUMMARY OF THE INVENTION

In a principal aspect, the fluid flow transducer incorporating the principles of my invention includes a housing having a cavity therein which is divided by a conductive partition means into a pair of chambers which communicate with each other. A pair of passages communicate with respective ones of the chambers for introducing and removing fluid from the cavity. An elongated pin is mounted on the partition means for reciprocal movement. The pin includes an electrically conductive end which is positioned in the fluid flow, the conductive end being normally positioned in a first position adjacent one of the passages to complete a circuit between a pair of electrical terminals and is reciprocally moveable to a second position by the fluid flow to open the circuit between the terminals.

These and other objects, features and advantages of the present invention will be more clearly understood through a consideration of the following detailed description.

BRIEF DESCRIPTION OF THE DRAWING

In the course of this description, reference will frequently be made to the attached drawing in which.

DESCRIPTION OF THE PREFERRED EMBODIMENT

Figure 1:
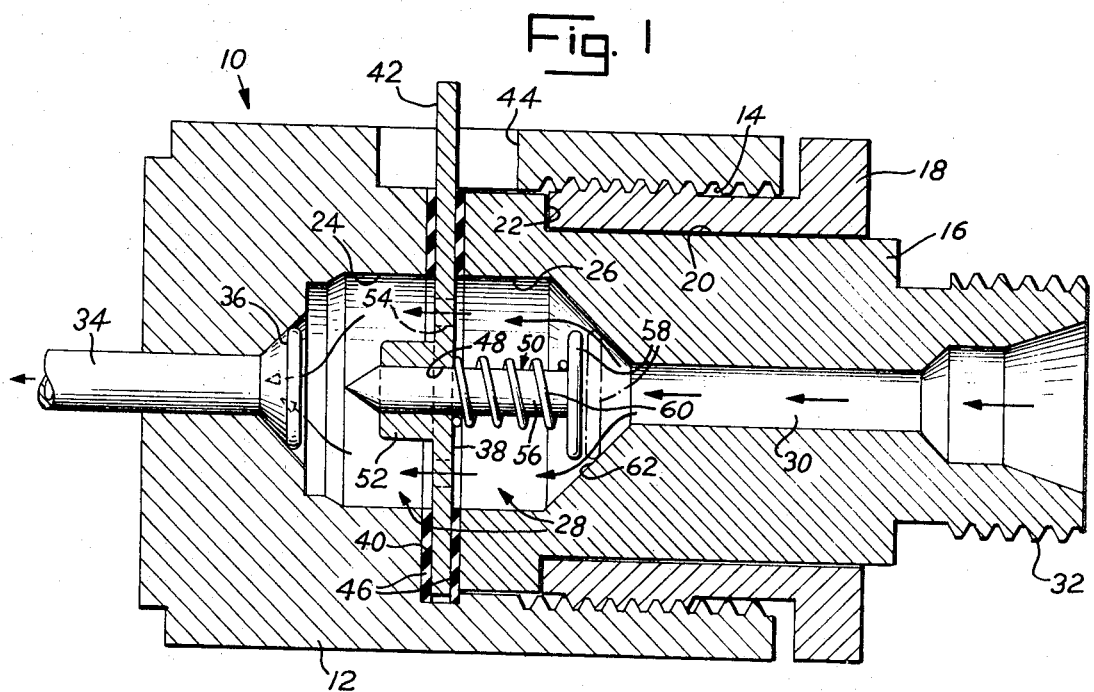
FIG. 1 is an elevation sectioned view of a preferred embodiment of fluid flow transducer constructed in accordance with the principles of my invention.

In FIG. 1 a preferred embodiment of fluid flow switch or transducer for generating signals in response to the pulses of a pulsating fluid and which incorporates the principles of my invention is shown. The transducer includes a housing, generally 10, which comprises a major cup-shaped portion 12 which is open at one end and threaded at 14 on the internal periphery thereof and a second portion 16 which is adapted to be fitted into the open end of portion 12. A threaded plug 18 is inserted in the annular space between the exterior surface 20 of portion 16 and the interior threaded surface 14 of portion 12. As shown in FIG. 1, the plug 18 is threaded down upon a shoulder 22 on the end of portion 16 to maintain the housing in integral assembled form.

Each of the housing portions 12 and 16 includes bores 24 and 26 which are of substantial diameter and when the portions are assembled together the bores align with each other to form a main cavity generally 28 within the housing. Bore 26 communicates with a passage 30 in the housing which, in turn, is adapted to be connected by fitting 32 with a source of the fluid, which may be by way of example the discharge of a fuel injection pump of a fuel injected combustion engine. A fuel line 34 leading to a fuel injector of the engine communicates with bore 24 and is bell fitted at 36 into the other end of the housing.

Figure 2:
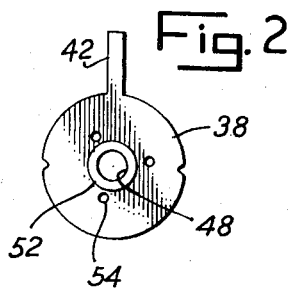
FIG. 2 is a front elevation view of the partition plate of the transducer of FIG. 1.

A partition plate 38 is sandwiched between the end of housing portion 16 and a shoulder 40 formed in portion 12. Referring particularly to FIGS. 1 and 2, the partition plate 38 comprises a substantially flat circular plate formed of a suitable conductive material, such as a metal. A tab 42 extends from one edge of the plate. The tab is adapted to fit through an opening 44 in housing portion 12 and extends to the exterior of the housing to form an electrical terminal to which a conductor lead of the signal circuit is attached. The plate is electrically insulated from the housing 10 by annular insulating washers 46 on each side of the plate. A central aperture 48 is provided in the plate in generally axial alignment with passage 30 and fuel line 34 and slideably receives a valve contact pin 50. A guide bushing 52 is carried on the plate downstream of the fluid flow to assist in guiding the valve contact pin in its reciprocal movement. A plurality of apertures 54, radially spaced about the guide bushing 52, provide flow communication between bores 24 and 26.

The valve contact pin 50 comprises an elongated cylindrical pin 56 which extends through the guide bushing 52 at on end and carries an enlarged conductive head 58 at the other end. A coil spring 60 is carried on the valve contact pin between the plate 38 and the enlarged head 58, normally urging the head into knife contact with the inclined wall 62 of bore 26 and generally closing communication between passage 30 and bore 26.

In the absence of a fluid pulse, the spring 60 urges the enlarged head 58 into positive contact with the inclined wall 62, as shown in the dotted depiction of FIG. 1. In such position an electrical circuit is completed through the terminal tab 42, the plate 38, the spring 60, the enlarged head 58 which forms a knife edge contact with wall 62, and the housing portion 16 to ground. As a pulse of fuel occurs, the flow overcomes the pressure of spring 60 moving the enlarged head 58 to the left and to the solid line position as shown in FIG. 1. In such position, the enlarged head 58 is no longer in contact with wall 62 and the circuit previously described is opened. In such spaced position, the fluid flows around the periphery of the enlarged head as shown by the arrows in FIG. 1, through bore 26, through the apertures 54 in plate 38, through bore 24 and out through the injector fuel line 34.

Figure 3:
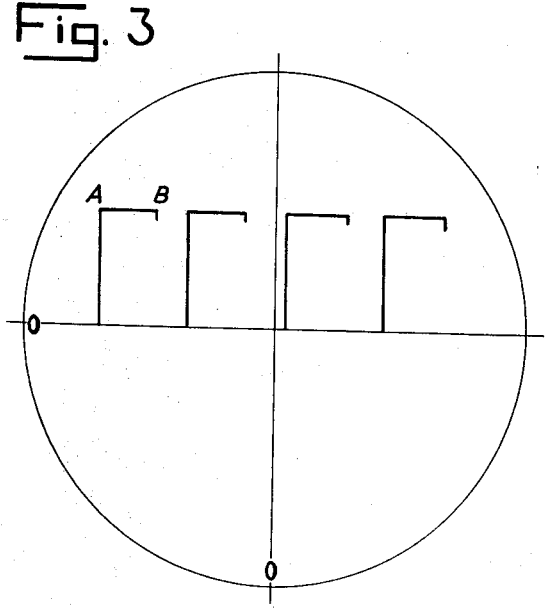
FIG. 3 is a representative graphic presentation of signals produced by transducers constructed in accordance with my invention.

A representative oscilloscope presentation of the signals produced by transducers, as above described, which are installed in each of the injector nozzle lines of a four cylinder engine, is shown by way of example in FIG. 3. In that FIG. each of the four peaks represents the signal produced by each of the respective ones of the transducers which are installed on the injection lines of the four cylinder engine, each of the peaks representing the pulsating flow of one of the injector nozzles of one cylinder. In the absence of fuel pulse, the head 58 contacts the wall 62 completing the circuit between the terminal tab 42 and the housing position 16. When a fuel pulse arrives at the head 58, the head is unseated and the circuit is broken. When the circuit is broken, the scope presentation rapidly peaks to point A and remains in that position for the time duration of the length of the pulse. When the fuel pulse ends the head is again seated against the wall due to the force exerted by spring 60 and the circuit is again completed terminating the presentation at point B, the time duration of the pulse being AB. It will be readily seen that if the transducer of my invention is installed in each of the fuel injection nozzle lines of the engine and in their respective signals fed to the oscilloscope, the time duration of the fuel pulses to each injection nozzle may be readily measured and the time duration of the pulses to each nozzle may be readily compared. Such presentation not only enables comparison of the various pulse time durations but also presents an indication of the beginning and end of each pulse and if the fuel line pressure is known, the volume of fuel delivered in each pulse may also be readily ascertained.

Although I have described the preferred embodiment of my invention as used with a fuel injection system and an indicating oscilloscope, it will be readily apparent that a transducer incorporating the principles of my invention may be employed to equal advantage in other fluid flow systems and the signals provided by the transducer of my invention may be employed in conjunction with other indicating devices such as timing lights or tachometers. It should also be understood that the embodiment of the invention which has been described is merely illustrative of an application of the principles of the invention. Numerous modifications may be made by those skilled in the art without departing from the true spirit and scope of the invention.

I claim:

1. A fluid transducer comprising:
  a housing having a cavity defined therein and having a pair of electrical terminals;
  electrically conductive partition means separating said cavity into first and second chambers which communicate with each other;
  a first passage communicating with one of said chambers and a second passage communicating with the other of said chambers to introduce and remove fluid from said cavity; and
  elongated pin means mounted for reciprocal movement on said partition means and having an electrically conductive end which is electrically connected to said partition means and positioned in the fluid flow, said conductive end being normally positioned in a first position adjacent said first passage completing the circuit between said terminals and being reciprocally moveable to a second position by the fluid flow in which the circuit between said terminals is opened.

2. The transducer of claim 1 wherein said housing includes a portion thereof which is electrically conductive, the end of the pin means contacting said portion when said end is in said first position and spaced from said portion when the end is moved to said second position, and insulating means insulating said partition means from said portion.

3. The transducer of claim 1 wherein said partition means comprises a plate arranged in said cavity substantially perpendicular to the flow of fluid, and aperture means defined in said plate communicating said chambers with each other.

4. The transducer of claim 3 wherein one of said terminals comprises a portion of said plate extending to the exterior of said housing.

5. The transducer of claim 3 wherein said plate includes an annular bushing positioned in axial alignment with said first passage, said pin means being slideably carried in said bushing for said reciprocal movement.

6. The transducer of claim 1 including spring means bearing against said partition means and normally urging said conductive end into said first position.

7. The transducer of claim 6 wherein said spring means electrically connects said conductive end and said partition means.

8. The transducer of claim 1 wherein said cavity is of a larger cross section than said first passage and the walls of the cavity and first passage are connected by an inclined annular wall, said conductive end contacting said inclined wall in knife edge contact in said first position and forming an annular space therebetween when in said second position.

9. The transducer of claim 1 wherein said cavity is constructed and arranged to enable reversal of said pin means wherein said conductive end is positioned adjacent said second passage when in said first position.

10. The transducer of claim 1 wherein said conductive end is of a substantially larger cross section than the remainder of said pin means.

11. The transducer of claim 1 wherein said pin means is reciprocal relative to said partition means.